Feb. 6, 1962  T. R. WHITNEY  3,020,406
ENERGY DETECTION APPARATUS
Filed Sept. 19, 1958  2 Sheets-Sheet 1

THEODORE R. WHITNEY
INVENTOR.

BY Jerry A. Dinardo
agent

Morris Spector
ATTORNEY

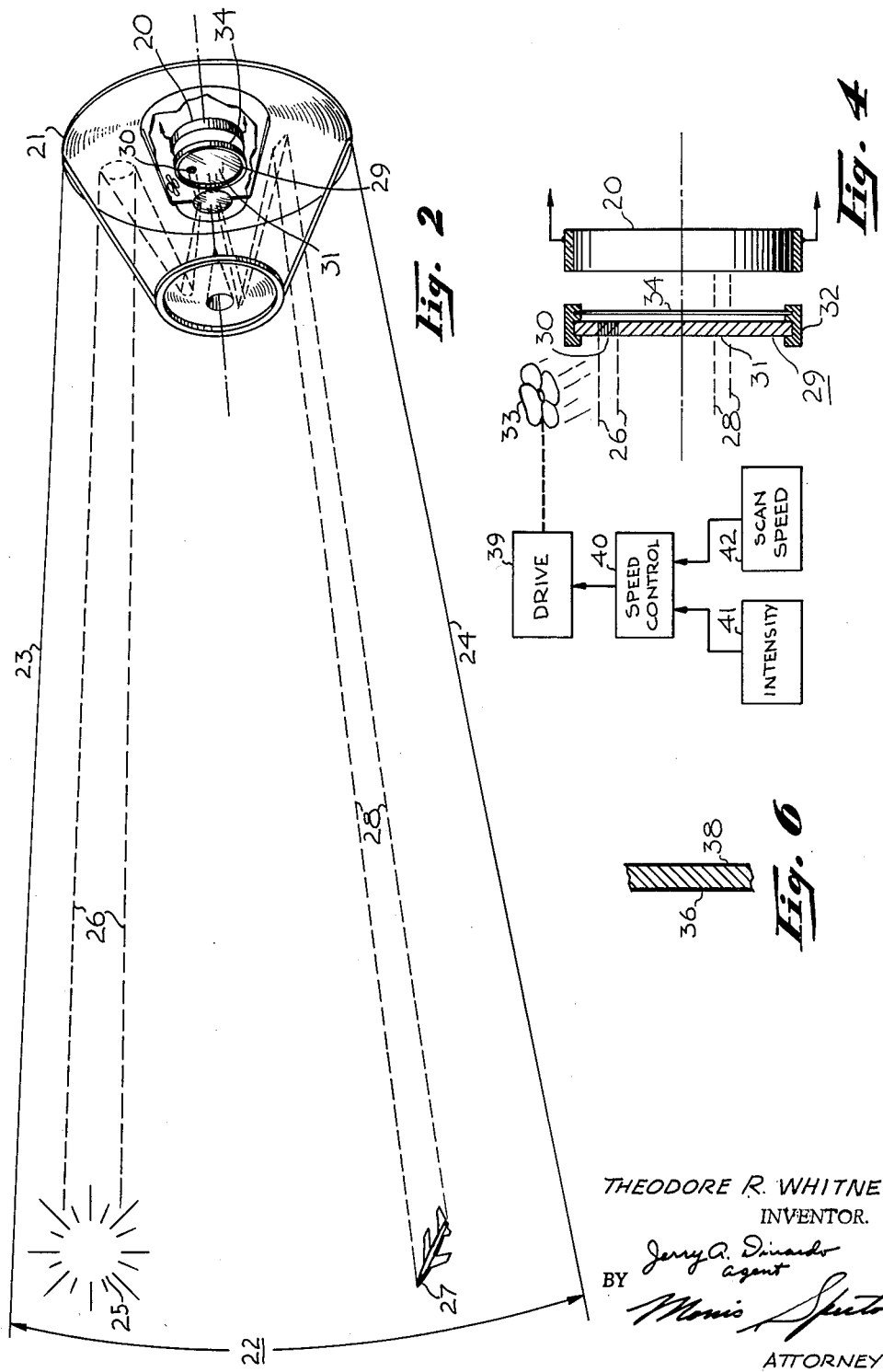

United States Patent Office 3,020,406
Patented Feb. 6, 1962

3,020,406
ENERGY DETECTION APPARATUS
Theodore R. Whitney, Los Angeles, Calif., assignor, by mesne assignments, to Thompson Ramo Wooldridge Inc., Cleveland, Ohio, a corporation of Ohio
Filed Sept. 19, 1958, Ser. No. 762,090
16 Claims. (Cl. 250—83.3)

The present invention relates to improvements in radiant energy transducing systems and more particularly to such systems in which radiant energy is imaged at a focal plane for transducing purposes.

In more particularity the present invention provides improved energy detection apparatus, such as infrared sensing apparatus, and automatic sun-shutter means for such apparatus so as to afford protection to sensitive energy detection devices therein from excessive infrared energy intensities.

In the use of infrared sensing devices incorporated in scanning systems, the areas scanned may include a part of the sky in which the disc of the sun appears. The sensing devices usually include optical systems for focusing the desired radiation on to the sensing element. If the energy represented in an image of the sun's disc were permitted to fall upon the sensing element the intense radiation could damage the element and could damage accessory reticles or other parts in the optical system.

Prior art methods of protecting the sensing element from the intense radiation of the sun's disc involve the use of mechanically actuated shutters which are arranged to be responsive to the appearance of the sun's disc in the optical field to actuate the shutter release mechanism and drop the shutter in front of the optical system. The shutter is lifted again when the field of view of the scanning system passes beyond the sun's disc. Usually a secondary photo-sensing element and appropriate circuits are necessary to provide the actuating and removing signals for the prior art shutters.

The present invention contemplates a novel, passive, permanently positioned energy controlling element, or sun-shutter, interposed between the optical system and the infrared detector or sensing element. The properties of the novel sun shutter are such that its transmissivity to energy to which the detector is responsive is a function of the intensity of energy incident upon the shutter. In one form of the invention, the characteristics of the novel sun-shutter are such that under ordinary temperatures infrared radiation is readily transmitted through the shutter. But, when energy of sufficient intensity, such as the visible rays of the sun, impinge on the shutter and are absorbed thereby to heat the shutter to a predetermined temperature, the shutter immediately becomes opaque to infrared radiation and remains opaque so long as the temperature remains at the predetermined level or higher. As soon as the temperature drops below the predetermined level the shutter recovers and becomes again transparent to infrared radiation. A particular characteristic of the sun-shutter of this invention is that the opacity can be limited to the immediate area upon which the intense heating radiation falls while areas nearby retain their infrared transparency. Thus, the energy controlling element of the present invention provides means for use in optical systems for imposing intensity selective attenuation upon energy emanating from different points within a given optical field of view.

A further characteristic of one form of sun-shutter according to the present invention is that the transition from transparency to opacity is substantially abrupt and the recovery from opacity back to transparency equally abrupt.

Accordingly, it is an object of the present invention to provide an improved energy controlling means for use in systems in which radiant energy is collected and transduced into another form of energy.

Another object of this invention is to provide greatly simplified and improved means for protecting radiant energy sensitive detecting devices from high intensity radiation, such as may be encountered in an infrared target detection system, while permitting the passage to said detecting devices of lower intensity radiation which said devices can safely withstand and which is contemporaneously received at said system along with said high intensity radiation.

It is another object of this invention to provide a passive sun-shutter for infrared radiation detectors, said shutter being opaque to infrared radiation in the presence of an image of the sun's disc and transparent to infrared radiation under ordinary conditions.

It is another object of this invention to provide a sun-shutter for infrared detecting apparatus by means of which sensitive elements of the apparatus may be protected from the intense radiation of the sun's disc with a minimum loss of detection area sensitivity.

It is still another object of this invention to provide a protective shutter for infrared radiation sensing devices which is normally transparent at ordinary temperatures but which becomes opaque at and in excess of a predetermined temperature, said shutter recovering its transparency when the temperature falls again below the predetermined value.

And it is yet another object of this invention to provide a normally transparent sun-shutter for infrared radiation sensing devices having a characteristic of becoming abruptly opaue when a certain temperature value has been exceeded and equally abruptly returning to its transparent condition when the temperature falls below the certain value.

These and other objects of this invention will appear from the detailed description of the invention which follows when taken together with the accompanying drawings in which:

FIG. 2 is a generally schematic representation of the principle of this invention and its use;

FIG. 4 is a detailed sketch of a represenstative embodiment of the sun-shutter of this invention;

FIG. 6 is a cross-sectional view of a modification of the sun-shutter of this invention.

Germanium and silicon metals, among others, in addition to their having semiconducting properties, are transparent to infrared radiation at ordinary temperatures. It has been found that when these metals are prepared in relatively thin samples of either monocrystalline or polycrystalline form having purities of five ohm-centimeters or better, the normally transparent material becomes opaque to infrared radiation at an elevated temperature. For germanium, the transition temperature is approximately 250° centigrade and higher; for silicon this temperature is 300° centigrade or higher. The transitions from infrared transparency to opacity and from opacity back again to transparency are abrupt as the temperature of the thin sample is raised above and returned again below the transition temperature. At temperatures removed from the transition temperature the absorption characteristics of the material do not change appreciably. The material thus has a non-linear transmissivity characteristic as a function of temperature.

Figure 1:
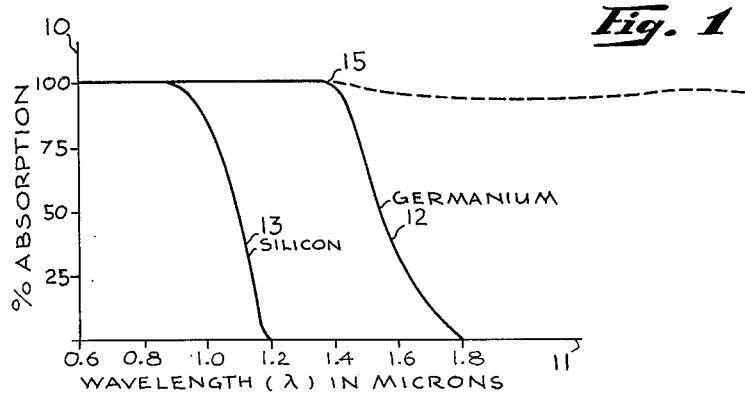
FIG. 1 is a chart of the normal optical absorption characteristics of germanium and silicon metals, representative materials that may be utilized in the sun-shutter of this invention.

The normal optical absorption characteristics of germanium and silicon at ordinary temperatures is shown in the chart of FIG. 1 to which reference is now made.

In the chart of FIG. 1 optical absorption 10 is plotted against wavelength 11 in microns. The curve 12 is plotted for a sample of germanium. The curve 13 is plotted for a sample of silicon. It may be seen from the curves 12 and 13 that for wavelengths of 1.2 microns for silicon and 1.8 microns for germanium, the metals are transparent. The transparency range, although not shown in the chart, is through about 15 microns. The infrared radiation range is from about .75 microns through 15 microns. Thus it may be seen that while they are absorptive in the visible light range at short wavelengths less than about 1.2 microns, germanium and silicon are normally transparent at the longer wavelengths in the infrared radiation region.

In FIG. 1, the transition point or threshold of transparency for germanium is shown at 15. In the presence of heating of the germanium, when temperatures of the order of 250° C. are reached, as has been noted above, the threshold or transition point is moved outside the infrared region in the direction of longer wavelengths, and the sample becomes absorptive or opaque to the infrared radiation.

When a sample is mounted in a fashion whereby the heating of the sample can be quickly dissipated so that when the source of heating is removed the sample or the heated area of the sample rises above and falls below the transition temperature value, which as has been pointed out, for germanium is 250° C. that area will be opaque to infrared radiation while heated and will be transparent when cooled.

To illustrate the use of the above-described phenomenon in the novel energy controlling device of this invention there has been drawn in FIG. 2 a schematic representation of how a thin slab of germanium metal, for example, can be embodied in an infrared detection system to act as a passive and automatic sun-shutter.

In FIG. 2 an infrared detector 20 has an optical system 21 in front of it. The capture cone or angular field of view 22 of the detection system is encompassed within the lines 23 and 24. Within the capture cone 22 at the representative instant of scanning, of which FIG. 2 is illustrative, the sun's disc appears along with a source of infrared radiation 27, such as an aircraft.

Between the infrared detector 20 and optical system 21 a thin sheet 29 or slab of material such as germanium is interposed. The germanium sheet 29 is positioned approximately at the focal plane of the optical system 21. Thus the energy intensity versus displacement distribution characteristic within the angular field of view is represented by the radiant energy intensity versus displacement distribution characterizing the image appearing at the focal plane. The detector 20, sheet 29 and optical system 21 are aligned along the optical axis of the system 21. In systems where a reticle or light chopper is used to discriminate between background and target objects, the sheet 29 and the reticle, shown at 34, may be mounted together at the focal plane as an integral unit, or slightly spaced apart, with the reticle 34, in the focal plane. To protect the reticle 34 against heat damage, the sheet 29 may be positioned in front of it, as shown. It may be seen that an image of the sun's disc 25 encompassed by lines 26 will fall in the portion 30 of the sheet 29 of germanium. An image of the infrared radiation source 27 encompassed by lines 28 will fall on an area 31 of the sheet 29 of germanium, the area 31 being displaced from the area 30. Thus the image produced in the sheet 29 will have an intensity versus displacement distribution corresponding to the radiant energy intensity versus displacement distribution characterizing the angular field of view.

According to the principle of operation described above, the area 30 of germanium sheet 29 will be heated by the image of the sun's disc, while the area 31 will remain relatively at its normal temperature. Therefore, area 30 will become opaque to infrared radiation, while area 31 will remain transparent to the infrared radiation. The image of the sun's disc will cause no response in the detector 20 while the image of the source of infrared radiation 27 will result in an output signal from the infrared radiation detector 20.

Figure 3:
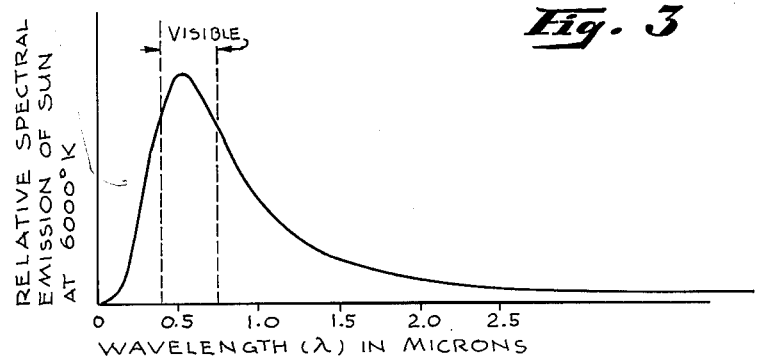
FIG. 3 is a graph of the radiant emission spectrum of the sun.

The manner in which the protective action of the sheet 29 occurs may be readily seen by referring to the graph of FIG. 3, which shows the emission spectrum of the sun at 6000° K. The graph shows the emission to be very intense in the visible region (.4 to .75μ) with the peak emission occurring at approximately .5μ. The graph also shows a dropping off of emission in the infrared range, which for use in most infrared detectors extends from .75 to 15μ. At normal room temperature, germanium will absorb to a high degree the sun's radiation at wavelengths below about 1.8μ. Silicon will absorb radiation of wavelengths below about 1.2μ. The sheet 29 therefore will absorb the intense visible radiation of the sun and thereby will shield the detector 20 from this radiation. In addition, by absorbing the visible radiation, the sheet 29 will be heated locally so as to raise the temperature of the sheet above the critical temperature to the point where it now will absorb rather than transmit the sun's infrared radiation (above 1.8 and 1.2μ for germanium and silicon respectively).

In FIG. 4 a more detailed drawing of the thin sheet 29 of germanium is illustrated mounted within a representative heat sink 32 which surrounds the sheet 29 about its periphery. The heat sink 32 carries off the heat generated in sheet 29 from the sun's image 25 concentrated onto area 30 by the optical system 21.

In operation, when in any area scanned by the infrared detection system there appears the sun's disc 25, the optical system 21 focuses the sun's image onto an area such as area 30 of the thin germanium or silicon sheet 29. The sun's radiation is so intense that it by far exceeds the maximum level which the detector 20 can usefully respond to, otherwise known as the saturation level. Were it permitted to fall directly on the detector 20, the sun's radiation would quickly destroy the detector 20. However, by interposing the sheet 29 in the path of the radiation, it becomes heated in the area 30 thereof to a temperature at which the normally transparent germanium or silicon sheet becomes instantly opaque. The area 30 on which the image of sun's disc 25 appears remains opaque as long as the image is present. The heat sink 32 dissipates the heat so that when the infrared detector scanner has passed over the area in which the sun's disc appears, the thin germanium or silicon sheet quickly cools and becomes transparent again to infrared radiation. While the area 30 excited by the heat is opaque, other areas, as 31 not so excited, are still transparent to the infrared radiation which may be present in nearby areas.

In order for the semiconductive sheet 29 to perform its desired function as a thermally responsive shutter in an infrared scanning system it must satisfy certain prescribed operating conditions. These conditions have to do with the speed of response of the shutter, both as to the time for reaching opacity and for reverting back to transparency, otherwise known as the thermal time constant of the shutter. In the first place, the time for the shutter to reach, say 90% of steady state opacity, should be much less than the exposure time required for the detector to saturate. In other words, the shutter should close well within the rise or saturation time of the detector. For example, a shutter response time of $10^{-4}$ seconds is adequate to protect most photosensitive detectors. The figure of 90% is used in this instance and in other instances below to illustrate a satisfactory, but not necessarily a minimum, operating condition.

Secondly, the time for the shutter to reach 90% of steady state opacity should be less than the period of scan for one angular field of view. For example, where the maximum rate of scan in 1000 degrees per second, and the angular field of view is 4 degrees, the period of scan for one field of view would be .004 second. The shutter should close within this time to afford the desired protection.

Thirdly, the time for the shutter to revert from its opaque condition and reach 90% of steady state transparency should not be greater than the time constant, or response time of the detector. This means that the shutter should open again within the lag time of the detector. The lag time refers to that period of time after exposure to radiation that current begins to flow in a photosensitive device.

The thermal time constants referred to above are affected by the thickness of the shutter material, the kind of material itself, and the impurity content. In general, both the time to reach opacity and the time to revert to transparency increase with increasing thickness of material. The impurity content determines the electrical and heat conductivity of the material and hence determines how fast the material becomes opaque. The time to revert to transparency may be shortened by selecting a material which has relatively high heat conductivity, such as germanium, in combination with a heat sink of high heat conductivity. In addition, external cooling means, such as a fan or the ilke, can be provided to direct a stream of cooling fluid, such as air or nitrogen so as to increase the rate of heat dissipation. The external cooling means is schematically shown in the form of a fan 33 in FIG. 4.

One other important operating condition which must be satisfied has to do with localizing the area of energization of the shutter to the spot where the sun's image appears. In this regard, spreading of the heat spot should be kept sufficiently low so that during scanning the maximum occluded area will be less than 20% of the effective detector area. In tracking, which refers to a mode of operation during which a given target is always under observation, the maximum occluded area should be less than 50% of the effective detector area. The amount of occluded detector area which can be tolerated is smaller for scanning than for tracking because during scanning the appearance of a target is only momentary, and it could easily escape detection if the occluded area is very large.

Figure 5:
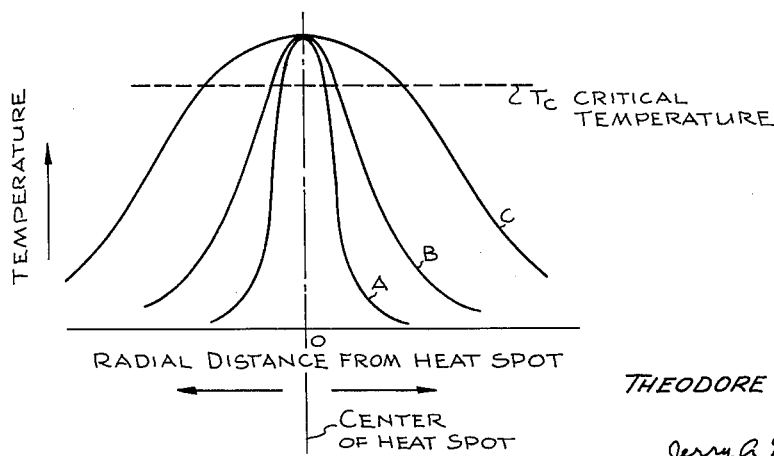
FIG. 5 is a graph illustrating the variation in temperature over the surface of a semiconductive sheet for different designs.

There are several ways in which localizing of the heat can be achieved. Fortunately, one of the constructions already described in connection with shortening the time constant of the shutter also can be used to advantage for the purpose of localizing the heat. This construction consists of a semiconductive material of high heat conductivity and a heat sink which could carry away the heat very rapidly. The intention here would be to make the radial heat flow in the semiconductive sheet so fast that areas adjacent to the heat spot would be kept relatively cool. This condition is illustrated in the graph of FIG. 5 by the curve A, which shows the variation in temperature over the surface area of a semiconductive sheet. The horizontal dash line represents the transition temperature, $T_c$, at which the material changes from transparency to opacity and vice-versa. Under these circumstances, the radial heat flow (in the direction parallel to the surface of the semiconductive sheet) is much less than the axial heat flow (in the direction of the thickness of the sheet).

Instead of encouraging heat flow, means may be provided for inhibiting radial heat flow in order to localize the heat. For this purpose, a semiconductive material with a relatively low thermal conductivity may be used in combination with a heat insulative mount instead of a heat sink. The mount can be made of glass or ceramic or other material of low heat conductivity, for instance. This condition is represented by the second curve B, in FIG. 5. Slightly greater spreading of the area of energization might be expected from this construction as compared to the first. However, both constructions would produce much less spreading than if no precautions are taken in this regard, as shown in the third curve C. In order to dissipate the heat produced in the semiconductive sheet 29 of low heat conductivity according to this construction, external cooling means, such as the fan 33, may be used.

Another alternative is to make the axial heat flow very high. Such a condition may be effected as shown in FIG. 6 by mounting a thin film 36 of the semiconductive material on a base 38 made of a material which has relatively higher thermal conductivity than the semiconductive material and which is transparent to the infrared radiation to be detected. The thickness of the film should be sufficient to render it opaque to visible light. Such a film need only be one or two microns thick as compared to the relatively thicker self-supporting constructions, which may be as much as ⅛ to ¼ inch thick. Instead of, or in addition to this film construction, it is contemplated that external cooling means, such as the fan 33 be advantageously employed. The fan 33, driven by drive means 39 and controlled in speed by the control means 40 is utilized to promote or otherwise control the rate of heat transfer from and within the semiconductor body 29. By properly directing the fan 33 to a surface of the body 29 which is transverse to the optical axis, the heat transfer within the body is made more rapid along the direction of the optical axis than in directions transverse thereto.

In further accordance with the present invention, it is contemplated that the degree of cooling imposed on the energy controlling element or body 29, be adjusted or made a function of the intensity of energy embraced by the field of view and/or the rate at which objects within the imaged field of view are caused to move with respect to the body 29. To this end speed control means 40 is provided with control information from a source 41 of intensity information and/or a source 42 of scan speed information. Source 41 may comprise nothing more than a signal transducing channel coupled to the output of the detector 20 in FIG. 2 while the source 42 may comprise a coupling channel to a servo drive apparatus (not shown) conventionally employed to drive the optical system 21 in FIG. 2 in scanning the field of view in space. In general it is preferred that the rate of cooling imposed on the body 29 be increased as image intensity decreases and as scan speed decreases. Thus the characteristics of the energy controlling unit are advantageously externally controlled either or both as a function of the intensity of the energy acting upon it and the time such energy is active upon elemental areas thereof.

There has been described a novel sun-shutter for infrared radiation detection systems involving a thin slab of a material such as germanium or silicon which has the property of being normally transparent to infrared radiation while not subject to localized heating, and which in an appropriate environment becomes opaque to infrared radiation only in the area heated. The transition from transparency to opacity is abrupt, as is the recovery transition from opacity to transparency.

What is claimed is:

1. Energy detection apparatus, comprising in combination: means for collecting energy emanating from within a given angular field of view and imaging said energy upon a focal plane to form an image of said field of view, said image having an energy intensity-versus displacement distribution characteristic substantially corresponding to the radiant energy intensity versus displacement distribution characterizing said angular field of view; energy transducing means responsive to the energy collected by said collecting means; a body of energy responsive material whose transmissivity to energy to which said energy transducing means is responsive is a function of the intensity of energy incident upon said body; and means positioning said body in energy controlling relation between said collecting means and said transducing means at substantially said focal plane so that an energy intensity distribution corresponding to that produced at said focal plane is produced within the material comprising said body to permit intensity selective attenuation upon energy emanating from different points within said given angular field of view prior to its sensing by said transducing means.

2. Energy detection apparatus according to claim 1, wherein said body of energy responsive material has a transmissivity characteristic which over at least a given range of incident energy intensities, is an inverse function of the intensity of said incident energy.

3. Energy detection apparatus according to claim 1, wherein said body of energy responsive material has an intensity versus transmissivity characteristic which is non-linear in nature, the transmissivity being substantially constant for a first given range of intensities, but decreasing as a function of intensity over a second range of intensities.

4. Energy detection apparatus according to claim 1, wherein the material of which said body is composed is one of the group consisting of germanium and silicon and has a purity of at least 5 ohm-cms.

5. Energy detection apparatus responsive to radiant energy intensity variations within a given angular field of view, comprising in combination: means for collecting energy emanating from within a given angular field of view and imaging said energy upon a focal plane to form an image of said field of view, said image having an energy intensity-versus displacement distribution characteristic substantially corresponding to the radiant energy intensity versus displacement distribution characterizing said angular field of view; energy sensing and transducing means responsive to the energy collected by said means, said transducing means being usefully responsive only to values of total energy which fall below a predetermined maximum; a body of energy responsive material whose transmissivity to energy to which said energy transducing means is responsive is a function of both the distance within said body through which energy is caused to pass and the intensity of energy incident upon said body; means positioning said body in energy controlling relation between said collecting means and said transducing means at substantially said focal plane so that an energy intensity distribution corresponding to that produced at said focal plane is produced within said body at at least a surface thereof, said body being dimensioned in the direction in which energy is caused to pass therethrough to produce sufficient attenuation of energy emanating from points within said given angular field of view which conditionally exceeds said predetermined maximum, so that the energy reaching said transducing means is below said predetermined maximum.

6. Energy detection apparatus responsive to radiant energy intensity variations within a given angular field of view, comprising in combination: means for collecting energy emanating from within a given angular field of view and imaging said energy upon a focal plane to form an image of said field of view, said image having an energy intensity-versus displacement distribution characteristic substantially corresponding to the radiant energy intensity versus displacement distribution characterizing said angular field of view; energy transducing means responsive to the energy collected by said collecting means; a body of thermally responsive material which is absorptive of energy to produce heat within the body and whose transmissivity to energy to which said energy transducing means is responsive is a function of the temperature of said body; and means positioning said body in energy controlling relation between said collecting means and said transducing means at substantially said focal plane, the heat conductivity of said body being sufficiently low to permit localized heating of portions of said body so that the temperature versus displacement characteristic produced within said body substantially corresponds to the energy intensity variations characterizing said imaged field of view, and so that the transmissivity versus displacement characterizing that portion of said body within said field of view is a function of the intensity versus displacement variations across said imaged field of view.

7. Energy detection apparatus according to claim 6, wherein the transmissivity of said body varies non-linearly with temperature and does not change substantially except for temperatures in excess of a predetermined value, and wherein the size and thermal conductivity of said body are so related as to permit substantial changes in the transmissivity of said body only for image intensities sufficient to raise the temperature of said body above said predetermined value.

8. Energy detection apparatus adapted for scanning movement at a predetermined maximum rate and for examining radiant energy intensity variations falling within a given angular field of view, during scanning, comprising in combination: means for collecting energy emanating from within a given angular field of view and imaging said energy upon a focal plane to form an image of said field of view, said image having an energy intensity-versus displacement distribution characteristic corresponding to the radiant energy intensity versus displacement distribution characterizing said angular field of view; energy sensing and transducing means responsive to the energy collected by said means, said transducing means being usefully responsive only to values of total energy which fall below a predetermined maximum; a body of thermally responsive material absorptive of said energy to produce heating therein and whose transmissivity to energy to which said energy transducing means is responsive is a function of both the distance within said body through which energy is caused to pass and the temperature of said body; means positioning said body in energy controlling relation between said collecting means and said transducing means at substantially said focal plane so that an energy intensity distribution corresponding to that produced at said focal plane is produced within said body at at least a surface thereof, said body being so dimensioned in the direction in which energy is caused to pass therethrough to produce sufficient attenuation of energy emanating from points within said given angular field of view which conditionally exceeds said predetermined maximum, that the energy reaching said transducing means is below said predetermined maximum, the thermal conductivity versus heat dissipation characteristic of said body being such as to cause said body to respond to energy changes within the scanning time of said field of view.

9. Energy detection apparatus responsive to radiant energy intensity variations within a given angular field of view, comprising in combination: means for collecting energy emanating from within a given angular field of view and imaging said energy upon a focal plane to form an image of said field of view, said image having an energy intensity-versus displacement distribution characteristic corresponding to the radiant energy intensity versus displacement distribution characterizing said angular field of view; energy sensing and transducing means responsive to the energy collected by said means, said transducing means being usefully responsive only to values of total energy which fall below a predetermined maximum; a body of thermally responsive material whose transmissivity to energy to which said energy transducing means is responsive is a function of both the distance within said body through which energy is caused to pass and the intensity of thermal energy developed within said body; means positioning said body in energy controlling relation between said collecting means and said transducing means along a common optical axis and at substantially said focal plane so that an energy intensity distribution corresponding to that produced at said focal plane is produced within said body at at least a surface thereof to develop a pattern of heat within said body corresponding to said imaged field of view, and means for cooling at least one surface of said body intercepting the collected energy to permit more rapid heat transfer along the direction of the optical axis than along directions transverse to said optical axis, so that the resulting localized heating within said body more faithfully represents the intensity distribution across said imaged field of view.

10. Energy detection apparatus responsive to radiant energy intensity variations within a given angular field of view, comprising in combination: means for collecting energy emanating from within a given angular field of view and imaging said energy upon a focal plane to form an image of said field of view, said image having an energy intensity-versus displacement distribution characteristic substantially corresponding to the radiant energy intensity versus displacement distribution characterizing said angular field of view; energy sensing and transducing means responsive to the energy collected by said means, said transducing means being usefully responsive only to values of total energy which fall below a predetermined maximum; a body of energy responsive material which is absorptive of energy falling within one spectral band and whose transmissivity to energy falling within another spectral band is a function of the energy in said one band which is absorbed by the body; means positioning said body in energy controlling relation between said collecting means and said transducing means at substantially said focal plane so that an energy intensity distribution corresponding to that produced at said focal plane is produced within said body at at least a surface thereof, and so that energy emanating from points within said angular field of view which exceeds said predetermined maximum and which has components in both of said spectral bands is absorbed in said body to the extent of keeping the total energy reaching said transducing means below said predetermined maximum.

11. Infrared detection apparatus adapted for scanning movement comprising means forming an energy collection system for collecting visible and infrared radiant energy impinging thereon within a given field of view and imaging said energy onto a given focal plane, an infrared sensitive transducing means mounted adjacent to said energy collection means and in energy receiving relation to energy collected thereby, said transducing means being usefully responsive to intensities of infrared energy not exceeding a predetermined amount, and control means interposed between said energy collection means and said transducing means to prevent infrared energy intensities in excess of said predetermined amount from reaching said transducing means from high intensity objects conditionally falling within said field of view which emanate high intensity radiant energy in both the visible and infrared regions, said control means comprising a body of material supported at approximately said focal plane and being responsive to energy in the visible spectrum which is collected in localized areas thereof to change the transparency of said body in said localized areas to infrared radiation, so that the intensity of infrared energy attributable to said high intensity object which reaches said photo-sensitive device is kept below said predetermined amount.

12. Infrared detection apparatus adapted for scanning movement comprising means forming an energy collection system for collecting radiant energy impinging thereon within a given field of view and directing said energy onto a given focal plane, a photosensitive device mounted adjacent to said energy collection means and in energy receiving relation to energy collected thereby, said photosensitive device being usefully responsive to intensities of energy not exceeding a predetermined amount and having a predetermined saturation time associated therewith, and means interposed between said energy collection means and said photosensitive device to pass to said photosensitive device radiant energy of intensities not exceeding said predetermined amount and to block from said photosensitive device radiant energy of intensities greater than said predetermined amount, said last mentioned means comprising a body of material supported at approximately said focal plane and being responsive to energy in the visible spectrum which is collected in localized areas thereof to produce heat and thereby change the transparency of said body in said localized areas to infrared radiation, the thickness of said body in the direction in which energy impinges thereon and the heat conductivity thereof being such that the response time of said body in reaching opacity is much less than said predetermined saturation time.

13. Infrared detection apparatus adapted for scanning movement at a predetermined maximum rate, comprising means forming an energy collection system for collecting radiant energy impinging thereon within a given field of view and directing said energy onto a given focal plane, a photosensitive device mounted adjacent to said energy collection means and in energy receiving relation to energy collected thereby, said photosensitive device being usefully responsive to intensities of energy not exceeding a predetermined amount, and means interposed between said energy collection means and said photosensitive device to pass to said photosensitive device radiant energy of intensities not exceeding said predetermined amount and to block from said photosensitive device radiant energy of intensities greater than said predetermined amount, said last mentioned means comprising a body of material supported at approximately said focal plane and being responsive to energy in the visible spectrum which is collected in localized areas thereof to produce heat and thereby change the transparency of said body in said localized areas to infrared radiation, whereby when the sun's disc appears within said field of view and is imaged on said focal plane, the visible rays of the sun will be absorbed in a local region in said body to the extent of rendering said body substantially opaque to the sun's infrared rays in said local region, so that the intensity of energy attributable to the sun's disc which reaches said photosensitive device is kept below said predetermined amount, the thickness of said body in the directions in which energy impinges thereon and the heat conductivity thereof being such that the response time of said body in reaching opacity is less than the time required for an object being scanned to pass through one field of view.

14. Infrared detection apparatus adapted for scanning comprising means forming an energy collection system for collecting radiant energy impinging thereon within a given field of view and directing said energy onto a given focal plane, a photosensitive device mounted adjacent to said energy collection means and in energy receiving relation to energy collected thereby, said photosensitive device being usefully responsive to intensities of energy not exceeding a predetermined amount, and means interposed between said energy collection means and said photosensitive device to pass to said photosensitive device radiant energy of intensities not exceeding said predetermined amount and to block from said photosensitive device radiant energy of intensities greater than said predetermined amount, said last mentioned means comprising a body of material responsive to energy in the visible spectrum which is collected thereon to produce heat and thereby to change the transparency of said body to infrared radiation, and means supporting said body at subtantially said focal plane, said means comprising a base of material which is infrared transmissive and has a higher thermal conductivity than said body, said body comprising a thin film supported by said base, whereby when the sun's disc appears within said field of view and imaged on said focal plane, the visible rays of the sun will be absorbed in a local region in said body to the extent of rendering said body substantially opaque to the sun's infrared rays in said local region, so that the intensity of energy attributable to the sun's disc which reaches said photosensitive device is kept below said predetermined amount.

15. In an infrared radiation seeking and detecting system having an infrared detecting device and an optical system arranged to focus said radiation upon a given focal plane, a sun-shutter interposed between said optical system and said detecting device substantially at said focal plane of said optical system, said sun-shutter comprising a thin slab of germanium metal of at least 5 ohm-centimeters purity, and characterized by the property of being normally transparent to infrared radiation and responsive to being heated above a predetermined temperature by the image of the sun's disc focussed thereon by the optical system whereupon said slab of germanium immediately becomes opaque to said infrared radiation and remains opaque so long as the image impinges thereon, said slab immediately recovering said normally transparent characteristic in the absence of said image.

16. In a radiant energy processing system the combination of: means for collecting radiant energy within a given field of view and directing said energy to form an image of said field of view at a focal plane within said collecting means; a body of energy responsive material, elemental areas of which exhibit a degree of opacity to said energy which is a function of the intensity of energy respectively incident upon said elemental areas; and means positioning said body substantially at said focal plane to intercept a substantial portion of said imaged field of view to produce a pattern of opacity variations in said body substantially corresponding to energy intensity variations appearing over the image of said field of view.

References Cited in the file of this patent

UNITED STATES PATENTS

| | | |
|---|---|---|
| 2,650,311 | Bray et al. | Aug. 25, 1953 |
| 2,666,583 | Witney | Jan. 19, 1954 |
| 2,671,154 | Burstein | Mar. 2, 1954 |
| 2,692,950 | Wallace | Oct. 26, 1954 |
| 2,824,235 | Hahn et al. | Feb. 18, 1958 |
| 2,856,540 | Warshaw | Oct. 14, 1958 |
| 2,861,165 | Aigrain et al. | Nov. 18, 1958 |
| 2,935,711 | Christensen | May 3, 1960 |

OTHER REFERENCES

Rittner: "Concerning the Theory of Photoconductivity in Infrared-Sensitive Semiconducting Films," June 23, 1950, issue of Science, pages 685 to 688.